May 7, 1940.   J. C. KARCHER   2,199,705
APPARATUS FOR MAKING ELECTRICAL SURVEYS OF BOREHOLES
Filed June 25, 1938   2 Sheets-Sheet 1

John C. Karcher
INVENTOR.
BY
ATTORNEY.

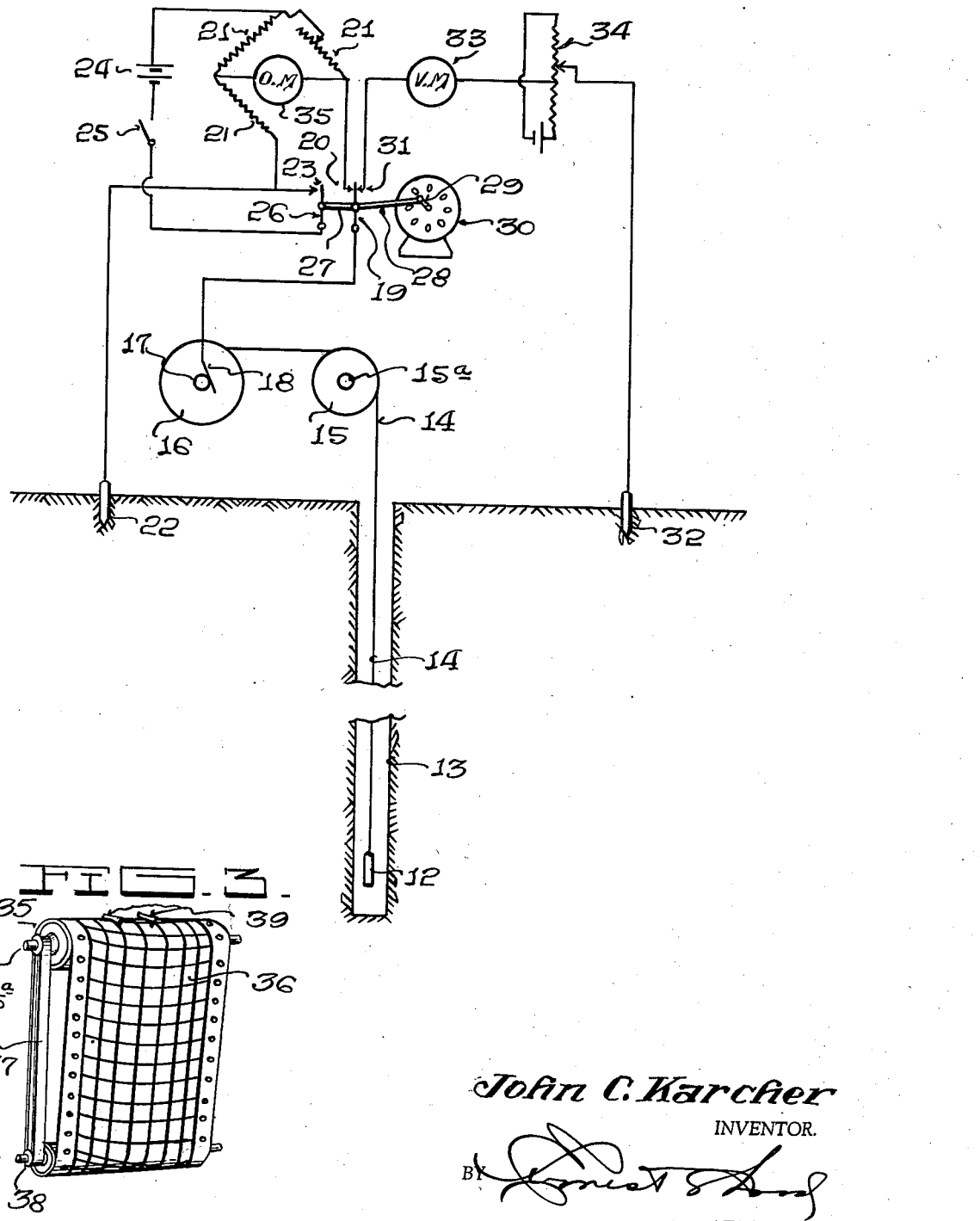

Patented May 7, 1940

2,199,705

UNITED STATES PATENT OFFICE 2,199,705

APPARATUS FOR MAKING ELECTRICAL SURVEYS OF BOREHOLES

John C. Karcher, Dallas, Tex.

Application June 25, 1938, Serial No. 215,905

5 Claims. (Cl. 175—182)

This invention relates to the making of electrical surveys of boreholes and it has particular reference to measurement of changes in the electrical resistance characteristics of earth formations encountered by an earth boring tool.

The principal object of the invention is to provide a method and apparatus whereby changes in physical permeability of formations encountered by an earth boring tool may be determined by the use of a single electrode suspended within the borehole and attached to a single insulated cable which is progressively moved along the axis of the borehole.

Another object of the invention is to provide a method of making electrical surveys of boreholes wherein the resistance measurement is accomplished by measuring the resistance between an electrode suspended within the borehole and a fixed electrode positioned within the surface of the earth.

Still another object of the invention is to provide a method of survey for boreholes in which an ohmmeter is employed and the necessity of intricate measuring instruments is eliminated.

Yet another object of the invention is to provide a method of making electrical surveys of boreholes by which cable leakage is of small consequence as long as the resistance to ground of the electrode in the borehole is substantially less than the resistance to ground of the cable due to leakage.

When a current is impressed upon an electrode positioned within a borehole concentration polarization in the vicinity of the electrode in the borehole will occur as described in Patent No. 2,085,664, the principle of the phenomenon being explained in "Electrochemistry" by Creighton and Fink (1938), vol. 1, pages 242 and 243.

The present invention contemplates a rapid switching of circuits including an electrode positioned within a well and including an ohmmeter circuit to a potentiometer circuit which is electrically connected through a second and independent ground connection. By mechanically or otherwise repeating this switching operation between the ohmmeter circuit and the millivoltmeter circuit at a predetermined and sufficiently rapid rate continuous indications may be obtained on both the ohmmeter and potentiometer indicators.

Heretofore, it has been common practice in the making of electrical surveys of boreholes to place two or more electrodes in the borehole, one of which is a potential electrode and the other a current electrode. Since the conductors leading to these electrodes pass down the same cable it is obvious that a slight leakage from the current conductor to the potential connection through the cable will result in ambiguous results, and when the cables are lowered into deep boreholes where great pressures are encountered, cable failures will readily occur.

The present invention provides a method whereby cable leakage is of no material importance as long as the resistance to ground of the electrode in the borehole is substantially less than the resistance to ground of the cable due to leakage.

For example, if a precision of measurement of one percent is desired and the resistance to ground of the electrode in the borehole is five ohms, a leakage resistance of five hundred ohms on the cable can be tolerated. Such a leakage resistance between two conductors of a two-conductor cable, would completely void reliability of any potentiometer measurements which might be made when such a cable is employed.

Moreover, a substantial saving in cost is obtained because a single conductor cable can be more economically manufactured than can a multiple conductor cable. The present invention provides a method whereby a single strand steel cable, which serves as the supporting member, can be used as the conductor by simply providing an insulating covering.

Referring to the drawings:

Figure 2 is a diagrammatic view of a modified form of the invention showing a method whereby automatic operation and recording is effected, and Figure 3 is a perspective view of the recorder chart which is driven from the measuring wheel of the apparatus.

Figure 1:
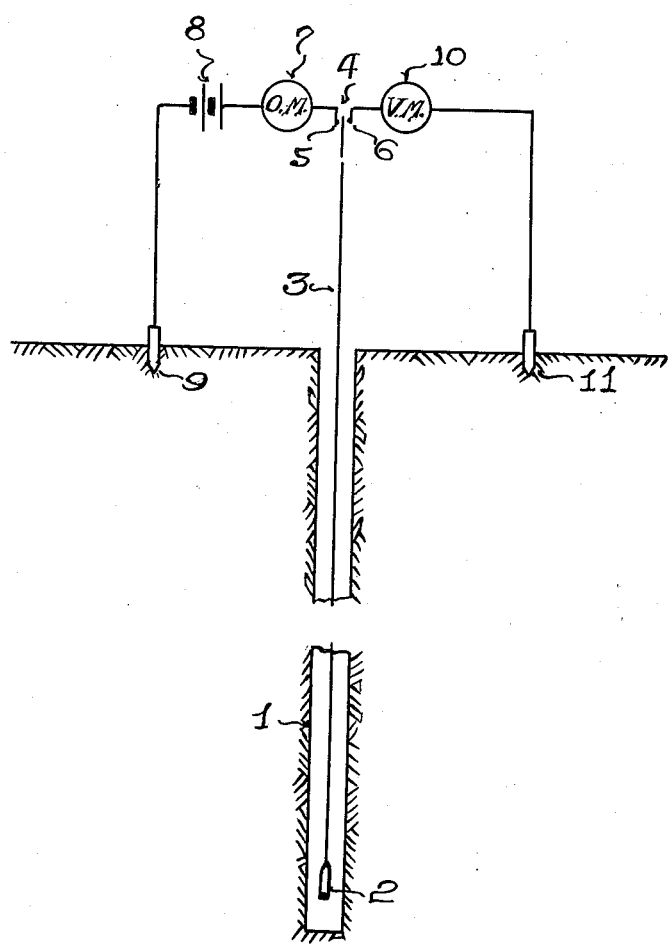
Figure 1 is a schematic arrangement illustrating one form of the invention.

Referring primarily to Figure 1, the reference numeral 1 designates a borehole into which an electrode 2 is lowered by means of a cable 3 leading to the surface of the earth. The cable 3 is attached to a switch 4, which switch includes contacts 5 and 6. Contact 5 leads through the ohmmeter 7, battery 8 and thence to a ground connection 9. Contact 6 leads through a voltmeter 10 to a ground connection 11.

In operation the contact 5 is primarily closed which provides a reading on the ohmmeter 7 as a result of the current impressed upon the circuit by the battery 8. The switch is then quickly moved to open the contact 5 and close contact 6 permitting the polarization voltage resulting from the previous passage of current to be measured on the voltmeter 10.

The above operations may be effected in the manner described, or continuous readings may be obtained by operating the switch 4 so as to alternately open and close the contacts 5 and 6 at a sufficiently rapid rate so that continuous indications are obtained on the meters 7 and 10. If such rapid alternation of switching is maintained at a constant rate, any changes in the resistance between the electrode 2 and ground connection 9 will be noted as the electrode 2 is moved along the axis of the borehole. Since the resistance between the electrode 2 and the drilling mud is substantially constant, as is likewise the resistance between the ground connection 9 and the earth, any observed variations in resistance will be due to changes in resistance characteristics of the formations adjacent the electrode 2, as it moves along the axis of the borehole. Polarization potentials are simultaneously observed by readings taken on the voltmeter 10.

Figure 2 illustrates diagrammatically a modified form of the invention wherein data are recorded on a chart during explorations of boreholes, the chart being arranged to move in unison with movement of an electrode 12 within a borehole 13. An insulated cable 14 is connected to the electrode and passes around a pulley 15 and thence is wound upon a cable drum 16. The inside end of the cable 14 is connected to a slip ring 17 to which ring contact is made by means of a brush 18 thereby completing a circuit from the electrode 12 to a vibrating reed 19 of an interrupter.

When the vibrating reed 19 of the interrupter is moved to the left a contact 20 is closed and a circuit is completed through a Wheatstone bridge arrangement comprised of the three arms 21 and the external arm which is closed between the electrode 12 and a ground connection 22. A contact 23 is closed simultaneously with the closing of the contact 20 so as to close a battery 24 across the Wheatstone bridge, a switch 25 being kept closed. A reed 26 and the reed 19 of the interrupter are caused to vibrate at constant speed and amplitude by means of insulated linkages 27 and 28 which linkages are connected to an eccentric arm 29 of a motor 30. When the reeds 26 and 19 are pulled to the right, contacts 20 and 23 are opened and a contact 31 is closed which connects the electrode 32 through the contact 31, voltmeter 33, the trimmer potentiometer 34 to the ground connection 32.

By operating the motor 30 at a sufficient rate of speed, the indicating elements of the ohmmeter 35 and voltmeter 33 will indicate continuously with the vibrations and indications can then be made of record on a recorder chart which is driven from the measuring wheel 15 in a manner well known to those skilled in the art of recording such types of instruments. In practice a conventional double chart indicator has been found suitable for this purpose.

In order to eliminate the effects of any self potentials between the electrode 12 and ground connection 32, at the beginning of operations the switch 25 may be left open and as a result of which there will be no polarization of the electrode 12 due to the application of any current thereto, and the potential reading on the voltmeter 33 will consist of self-potential existing between the electrode 12 and the ground connection 32. The slide contact on the potentiometer 34 is then adjusted until zero reading is obtained on the voltmeter 33. The switch 25 is then closed and measurements subsequently taken. The ground connections 22 and 32 can be made common if a non-polarizing electrode is used.

Referring to Figure 3 the reference numeral 15a denotes the shaft of the pulley 15 which is arranged to rotate therewith. A pulley 35 is affixed to the shaft 15a and serves to drive a recording chart 36 through the medium of a belt 37 and a pulley 38. Pen elements or styluses 39 serves to record desired data upon the chart 36. Other additional data may be obtained upon the chart 36 by the use of additional pen elements movable in accordance with variations in readings of the instruments as the electrode 12 is moved along the axis of the borehole 13.

Manifestly, the construction of the apparatus and the steps of the method described herein are capable of considerable modification and such modification as is considered within the scope and meaning of the appended claims is also considered within the spirit and intent of the invention.

What is claimed is:

1. Apparatus for exploring earth formations within a borehole, means comprising an electrode, means for raising and lowering said electrode in said borehole, means for passing electrical current between said electrode and a fixed point in the earth, means for measuring said electrical current, and means for switching said electrode from the current source to a second fixed point in the earth through a potential measuring device.

2. Apparatus for exploring earth formations down a borehole, an electrode within said borehole, means for alternately connecting said electrode through a source of electric current to a fixed electrode in the earth, and to a second fixed electrode in the earth whereby to comprise a circuit not including said source of electric current, means for measuring the electrical current in the first circuit, means for measuring the potential difference between the said electrode in said borehole and said second fixed electrode in the earth in said second circuit, and means to effect alternations at a rate sufficiently rapid to cause a constant indication to be obtained on measuring means for said current and for potential differences.

3. Apparatus for exploring earth formations down a borehole, an electrode within said borehole, means electrically connected to said electrode for raising and lowering said electrode in said borehole, means for passing electrical current between said electrode and a fixed point in the earth, means for measuring said current, means for alternately switching said electrode from said current source to a second fixed point in the earth through a potential measuring device, and means for recording measurements of said current and indications of said potential measuring device upon a chart moving in unison with the movement of said electrode along the axis of the borehole.

4. Apparatus for exploring earth formations down a borehole including means for alternately connecting an electrode positioned within the borehole through a source of electric current to a fixed electrode in the earth, and to a second fixed electrode in the earth without passing through the source of electric current, means for recording the electric current in the first named circuit, means for recording the potential difference between the electrode in said borehole, and said second fixed electrode in the earth in the second circuit, means for effecting alternations at a sufficiently rapid rate to cause a constant indication to be obtained on a means for recording current and potential difference, and means for driving a chart of the current and potential recorders in unison with the movement of the electrode along the axis of the borehole.

5. Apparatus for exploring earth formations down a borehole including means for alternately connecting an electrode within the borehole through a source of electric current to a fixed electrode in the earth, comprising the first circuit, and to a fixed electrode in the earth without passing through the source of electric current whereby to comprise a second circuit, means for recording the electric current in the first circuit, means for recording the potential difference between said electrode in said borehole and said second fixed electrode in the earth, means to effect alternations at a sufficiently rapid rate to cause constant indications to be obtained on the current and potential difference recording means, and means for driving the said recording means in unison with movement of the electrode along the axis of the borehole.

JOHN C. KARCHER.